United States Patent

Murtha

Patent Number: 6,021,007
Date of Patent: Feb. 1, 2000

[54] SIDE-COLLECTING LIGHTGUIDE

[76] Inventor: R. Michael Murtha, 1010 Janetwood Dr., Oxnard, Calif. 93030

[21] Appl. No.: 08/953,874

[22] Filed: Oct. 18, 1997

[51] Int. Cl.[7] .............................. G02B 5/04; G02B 6/34; G02B 27/00
[52] U.S. Cl. .................. 359/834; 359/837; 359/627; 359/628; 359/613; 385/36; 385/129; 385/146; 385/147
[58] Field of Search .................... 359/601, 613, 359/615, 831, 833, 834, 837, 592, 593, 594, 595, 597, 598, 619, 627, 628, 639, 640; 385/36, 37, 129, 133, 146, 147, 901

[56] References Cited

U.S. PATENT DOCUMENTS

| 720,386 | 2/1903 | Wadsworth | 359/594 |
|---|---|---|---|
| 734,020 | 7/1903 | Wadsworth | 359/595 |
| 3,009,389 | 11/1961 | Ewing | 359/593 |
| 3,393,034 | 7/1968 | Imai | 359/613 |
| 3,603,670 | 9/1971 | Kim | 359/593 |
| 4,357,486 | 11/1982 | Blieden et al. . | |
| 4,505,264 | 3/1985 | Tremblay | 359/834 |
| 5,731,900 | 3/1998 | Milner | 359/837 |
| 5,880,886 | 3/1999 | Milner | 359/597 |

OTHER PUBLICATIONS

Goetzberger et al; "Solar Energy Conversion with Fluorescent Collectors"; Applied Physics; 14; (1977) pp. 123 and 139.

Primary Examiner—Ricky D. Shafer

[57] ABSTRACT

A plate collects light and guides it to an internal focus (20). The plate is constructed of prisms (2) that allow simultaneous reflection and transmission of light. The prisms are easily mass-produced. The prismatic plate can be formed into many shapes.

3 Claims, 7 Drawing Sheets

SIDE-COLLECTING LIGHTGUIDE

FIELD OF THE INVENTION

This invention relates to the collection of light, specifically to a new type of prism that is the building block for a family of side-collecting lightguides.

DESCRIPTION OF THE PRIOR ART

The Fluorescent Solar Energy Collector (A. Goetzberger and W. Greubel, 2501907, 1976, Federal Republic of Germany) places a focus in the same plane as the collecting optic. That collector is a plate which contains fluorescent dye molecules for the absorption of incident sunlight. After absorption the molecules emit a longer wavelength light which is internally guided to photovoltaic cells mounted all around the collector's edge. As a working medium, the dye performs under certain fundamental and practical constraints. For example, light throughput efficiency is severely limited by self-absorption losses that are characteristic of fluorescent dyes. Also, the fluorescence is emitted isotropically, producing an enlarged focal zone. A further disadvantage is that fluorescent agents decompose under sunlight, reducing the service life of the collector.

SUMMARY OF THE INVENTION

The primary object of this invention is to provide simultaneous collection and guidance of light using a plate of interlocking prism elements as the working medium. This new kind of optical system has many advantages, including: (a) a tight focus inside the collecting optic, (b) a very wide acceptance angle, (c) good efficiency, (d) broadband collection, and (e) a long service life.

Accordingly, the primary object is accomplished in the following manner: Prism elements are laid side-by-side to build a collecting lightguide. Using total internal reflection, all of the prisms capture incident light directing it toward the focal zone at one end of the system. During its guided journey the light intensity is made ever greater by the additional energy contribution of each passing prism. A photoreceiver is disposed in the focal zone to accept the concentrated light. As a practical matter, the adjacent elements are to be sealed in an enclosure that will admit light, exclude moisture and maintain system alignment.

Other objects and advantages of this low-profile concentrating collector will become apparent from the following detailed description and accompanying drawings.

DESCRIPTION OF THE PREFERRED EMBODIMENTS

This invention is amenable to innumerable modifications and alternative constructions. Therefore, only preferred embodiments are referred to in the description, shown in the drawings and set forth in the claims.

Figure 1A:
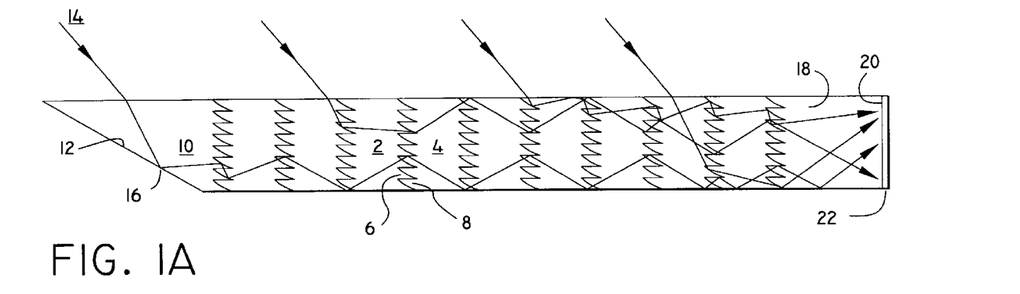
FIG. 1A is a cross-sectional view of a flat side-collecting lightguide.

Turning now to FIG. 1A there is shown a side-collecting lightguide composed of a series of air-spaced prism elements. Prism 2 has a row of facets 6 that interlock with matching facets 8 of adjacent prism 4. The interlocking facets are formed to allow the collector to have a level series of top and bottom surfaces. Outermost prism 10 has a collection surface 12 shown capturing ray 14 by total internal reflection at point 16. Ray 14 is guided through many abutting prisms that are also collecting light. The ray is reflected or transmitted depending on the angle at which it approaches the facet surfaces. Intermediate prisms, such as 2 and 4, fill-in the body of the collector, acting as links between the outermost prism and the innermost prism. Innermost prism 18 contains a smooth focal zone surface 20, which is the final downstream destination of all the collected light. Attached to focal zone surface 20 is a photovoltaic cell 22 that couples-out the concentrated light, converting it into an electron flow that is proportional to light intensity.

Figure 1B:
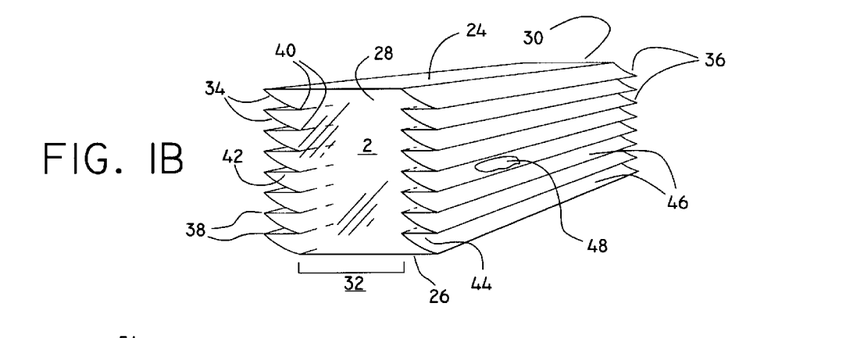
FIG. 1B is a perspective view of a faceted prism of FIG. 1A.

In FIG. 1B there is shown the linear intermediate prism 2 from FIG. 1A. Prism 2 has a quadrilateral profile in cross-section. The solid dielectric prism has a smooth top surface 24 through which light enters the collector. Smooth bottom surface 26 is plane-parallel to top surface 24. Prism element ends 28 and 30 are also smooth and flat. The top, bottom and end surfaces serve to guide light to the downstream end of the collector. The prism has a row of triangular collecting-facets 34 on the left side and a row of triangular guiding-facets 36 on the right side. Width 32 can be varied to ensure that the facets collect the greatest range of incident rays. Facet peaks 38 share a common plane perpendicular to top surface 24. Facet valleys 40 also share a common plane. Facet draft surfaces 42 and 44 have angles that are plane-parallel to the top and bottom surfaces. Each integral facet member 46 is parallel to every other integral facet member and all exist coextensively along the two opposing sides of the elongated prism body. Anti-reflection film 48 is applied to all facet member surfaces to greatly reduce Fresnel reflection losses.

Figure 1C:
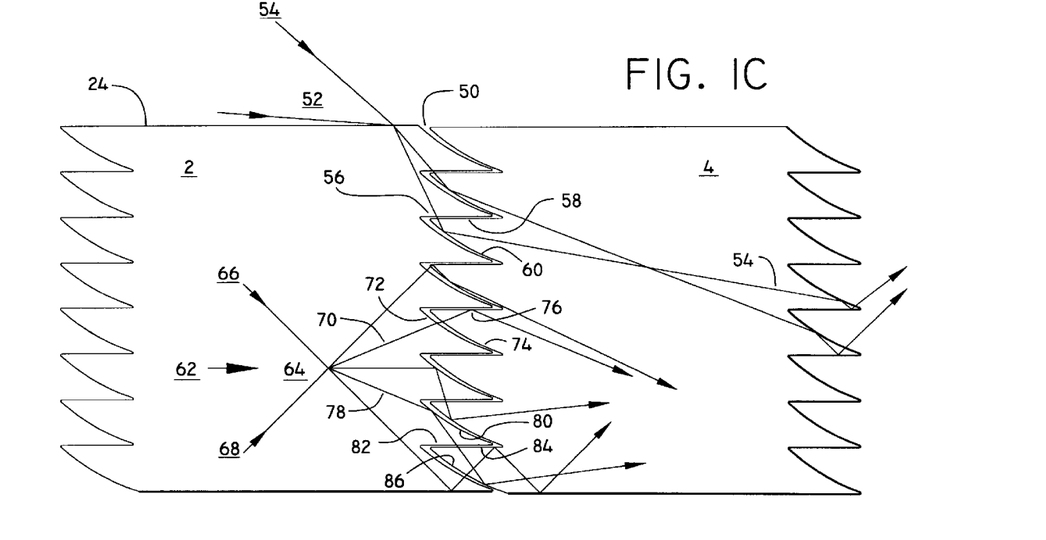
FIG. 1C is a cross-sectional view of identical interlocking prisms of the first preferred embodiment.

FIG. 1C shows the two identical intermediate prisms 2 and 4 from FIG. 1A. The interlocking prisms are separated by an air space 50 which provides the condition for total internal reflection. Additionally, all light that has been captured upstream of this position must cross air space 50 to reach the focal zone. A range of incident light rays 52 is shown entering the prism through top surface 24. All rays entering the prism within range 52 are captured in the same manner. For example, ray 54 impinges top surface 24 and is refracted according to Snell's law into the interior of prism 2. The ray then transmits surface 56, air space 50 and surface 58, entering into adjacent prism 4. Ray 54 then impinges concave collection surface 60 at greater than the critical angle and is reflected into the plane of the lightguide. The ray is now captured and will be guided to the focal zone through all of the remaining prisms. At the same instant, all the remaining prisms are collecting light in the same manner. A definite flow direction 62 has now been established from left to right. The flow consists of all light that has been captured into a guided range 64 of ray path angles. Rays 66 and 68 are the maximum angled rays of guided range 64. Also, rays 66 and 68 just meet the critical angle requirement to be internally reflected at the top and bottom prism surfaces. Once captured the majority of rays remain in guided range 64 until they reach the focal zone. During the guided journey the ray angles are constantly changing within the guided range due to the many intervening facet surfaces. For example, guided ray 70 approaches convex surface 72 at less than the critical angle. The ray transmits through that surface, air space 50, and surface 74. Now inside adjacent prism 4, ray 70 reflects at surface 76 and continues on to the next set of facets. In another example, ray 78 approaches surface 80 at greater than the critical angle. It is reflected downward through surface 82, air space 50 and surface 84. Now inside adjacent prism 4, ray 78 reflects at surface 86 and continues on to the next set of facets. Surface 86 simultaneously performs as a collection surface for incident rays and a guiding surface for captured rays. The other guided rays that are shown also cross space 50 and result in path angles that stay within guided range 64. The light is completely homogenized when it reaches the focal zone.

Figure 2:
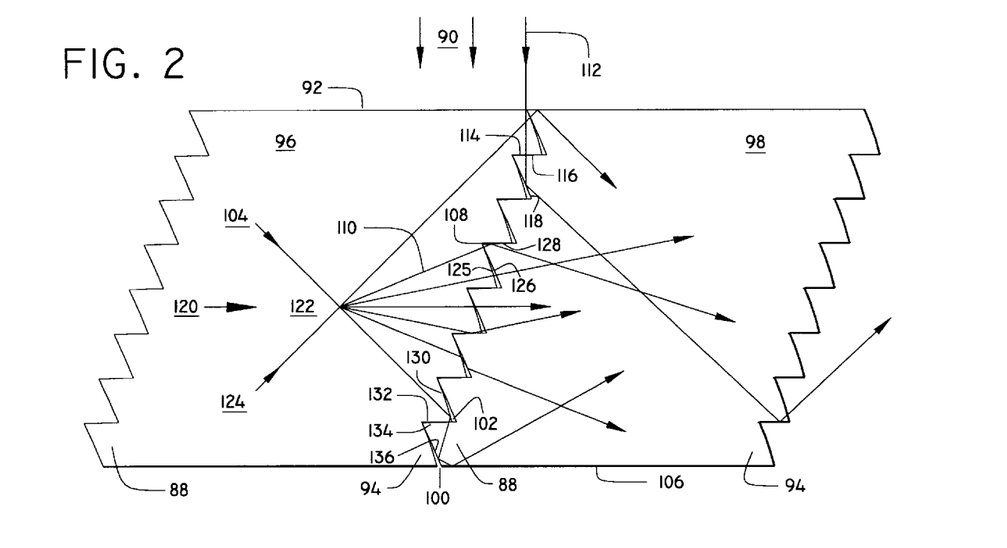
FIG. 2 is a cross-sectional view of identical interlocking prisms of the second preferred embodiment.

In FIG. 2 there is shown a new set of identical intermediate prisms, 96 and 98. Each prism has a row of triangular collecting-facets 88 that are optimized to accept normal incident light 90. And, each prism has a row of guiding-facets 94 that are formed to interlock with collecting-facets 88. The integral facet rows have the same tilt angle, giving the prism a rhomboidal cross-section. Identical prisms 96 and 98 are laid side-by-side and separated by an air space 100. Air space 100 has been modified at regular intervals resulting in triangular air prisms. Air prisms are formed by the surface profile differences between facets 88 and 94. For example, when surface 130 is tilted to ensure that descending ray 104 will be guided from facet to facet, air prism 102 is the result. And, air prism 108 is the result when surface 128 is tilted slightly to ensure that ascending rays, such as 110 or 124, are guided into less acute path angles.

Normal incident ray 112 is shown entering the prism through top surface 92. The ray then transmits surface 114, air space 100 and surface 116, entering into adjacent prism 98. Ray 112 then impinges collection surface 118 at greater than the critical angle and is reflected into the plane of the lightguide. The ray is now captured and will be guided sequentially through all of the intervening prisms to the focus. At the same instant, all of the other prisms are collecting light in the same manner. A flow direction 120 has been established from left to right. The flow consists of all light that has been captured into a guided range 122 of ray path angles. Rays 104 and 124 are the maximum angled rays of guided range 122. Also, rays 104 and 124 just meet the critical angle requirement to be internally reflected at the top and bottom prism surfaces. Once captured the majority of rays remain in guided range 122 until they reach the focal zone. During the guided journey the ray angles are constantly changing within the guided range due to the many intervening facet surfaces. For example, guided ray 110 approaches surface 125 at less than the critical angle. The ray transmits through that surface, air space 100, and surface 126. Now inside adjacent prism 98, ray 110 reflects at surface 128 and continues on to the next set of facets. In another example, ray 104 approaches surface 130 at greater than the critical angle. It is reflected downward through surface 132, air space 100 and surface 134. Now inside adjacent prism 98, ray 104 reflects at surface 136 and bottom surface 106, then continues on to the next set of facets. Surface 136 simultaneously performs as a collection surface for incident rays and a guiding surface for captured rays. The other guided rays that are shown also cross air space 100 and result in path angles that stay within guided range 122.

Figure 3:
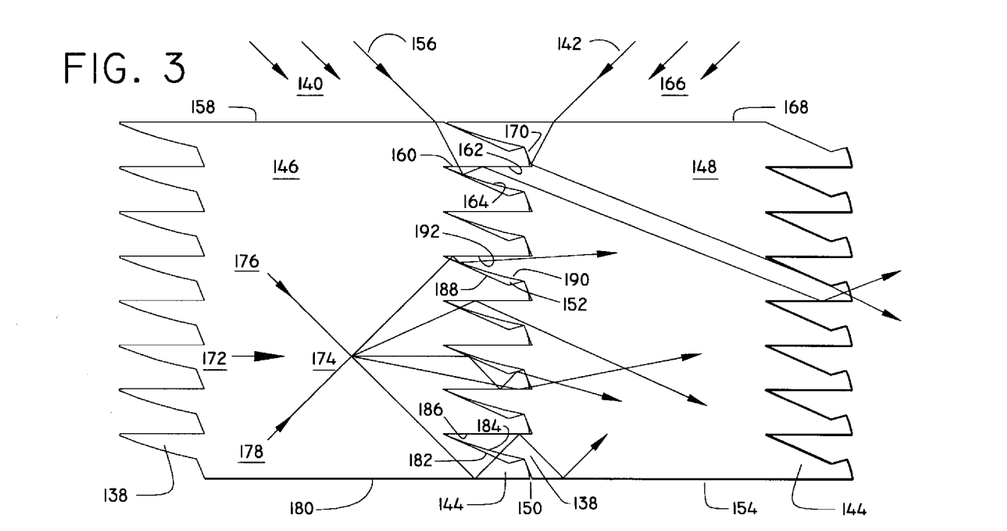
FIG. 3 is a cross-sectional view of identical interlocking prisms of the third preferred embodiment.

In FIG. 3 there is shown a new set of identical intermediate prisms, 146 and 148. Each prism has a row of collecting-facets 138 that accept incident light 140 approaching from the left (with the flow) and incident light 166 approaching from the right (opposite the flow). And, each prism has a row of guiding-facets 144 that are formed to interlock with collecting-facets 138. The interlocking facet rows are perpendicular to the top and bottom surfaces, giving the prism a rectangular cross-section. The facet rows are shifted in translation so that the interlocking action produces a coplanar set of top surfaces 158 and 168, as well as a coplanar set of bottom surfaces 180 and 154. The coplanar surfaces greatly facilitate the guidance of captured light. Identical prisms 146 and 148 are laid side-by-side and separated by an air space 150. The air space has been modified at regular intervals resulting in triangular air prisms. Air prisms are formed by the surface profile differences between facets 138 and 144. For example, when surfaces 188 and 190 are tilted apart for better guidance geometry, air prism 152 is the result.

Incident ray 156 is shown approaching from the left and entering prism 146 through top surface 158. The ray is refracted according to Snell's law. It then transmits surface 160, air gap 150 and surface 162, entering into adjacent prism 148. Ray 156 then impinges collection surface 164 at greater than the critical angle and is reflected up to surface 162 where it is internally reflected into the plane of the lightguide. Incident ray 142 is shown approaching from the right and entering prism 148 through top surface 168. Upon refraction the ray impinges collection surface 170 at greater than the critical angle and is reflected into the plane of the lightguide. Rays 156 and 142 are now captured and will be guided serially through all of the remaining prisms to the focus. At the same instant, all of the other intermediate prisms are collecting light in the same manner. A flow direction 172 has been established from left to right. The flow consists of all light that has been captured into a guided range 174 of ray path angles. Rays 176 and 178 are the maximum angled rays of guided range 174. Once captured the majority of rays remain in guided range 174 until they reach the focal zone. During the guided journey the ray angles are constantly changing within the guided range due to the many intervening facet surfaces. For example, guided ray 176 approaches bottom surface 180 at greater than the critical angle. The ray internally reflects ascending through surface 182, air space 150, and surface 184. Now inside adjacent prism 148, ray 176 internally reflects at surfaces 186 and 154 then continues on to the next set of facets. In another example, ray 178 approaches surface 188 at less than the critical angle. It then transmits through that surface, air prism 152 (of air space 150) and surface 190. Now inside adjacent prism 148, ray 178 reflects at surfaces 192 and 190, then continues on to the next set of facets. Surface 190 simultaneously performs as a collection surface for incident rays and a guiding surface for captured rays. The other guided rays that are shown also cross the air space 150 and result in path angles that stay within guided range 174.

Figure 4:
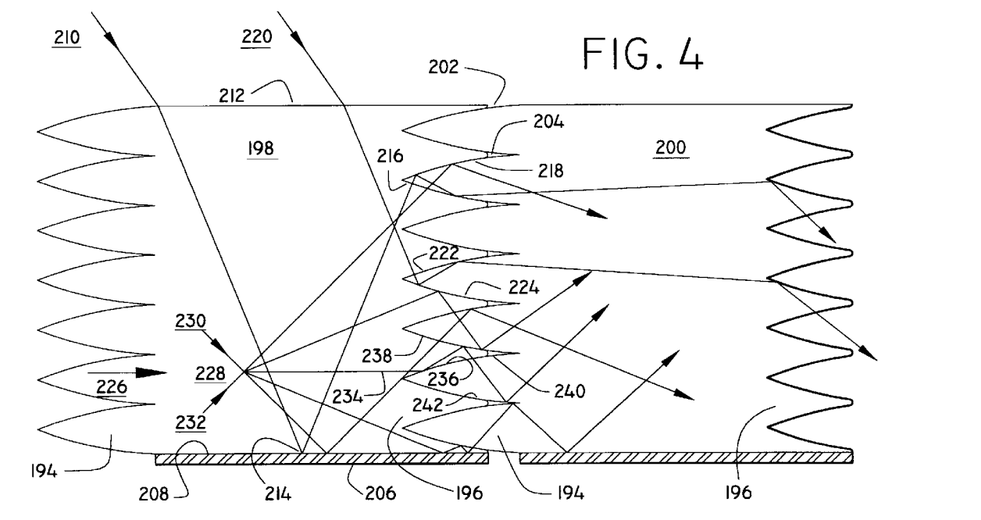
FIG. 4 is a cross-sectional view of identical interlocking prisms of the fourth preferred embodiment with reflective coating.

In FIG. 4 there is shown a new set of identical intermediate prisms, 198 and 200. Each prism has a row of ogive (pointed arch) collecting-facets 194 that are optimized to accept incident light that approaches the lightguide from the left. And, each prism has a row of guiding-facets 196 that are formed to interlock with collecting-facets 194. The integral facet rows have the same tilt angle, giving the prism a rectangular cross-section. Identical prisms 198 and 200 are laid side-by-side and separated by an air space 202. Air prism 204 is formed by the surface profile differences between facets 198 and 200.

This prism incorporates a metal reflective coating 206 on the bottom surface 208. The reflective coating 206 allows the prism to be twice-as-wide by collecting the extra light and reflecting it over to facets 194. For example, incident ray 210 is shown entering prism 198 through top surface 212. The ray is refracted and propagates toward bottom surface 208. Instead of exiting the prism, ray 210 impinges coating 206 at point 214 and is reflected over to collecting-facets 194. The ray then approaches surface 216 at less than the critical angle and transmits into prism 200. Ray 210 then impinges collection surface 218 at greater than the critical angle and is reflected into the plane of the lightguide. At the same instant, incident ray 220 enters prism 198, refracts and approaches surface 222 at less than the critical angle. Ray 220 transmits into prism 200 and is reflected into the plane of the lightguide by collection surface 224. Rays 210 and 220 are now captured and will be guided sequentially through all of the intervening prisms to the focus. A flow direction 226 has been established from left to right. The flow consists of all light that has been captured into a guided range 228 of ray path angles. Rays 230 and 232 are the maximum angled rays of guided range 228 and just meet the critical angle requirement to be internally reflected at the top and bottom prism surfaces. Once captured the majority of rays remain in guided range 228 until they reach the focal zone. During the guided journey the ray angles are constantly changing within the guided range due to the many intervening facet surfaces. For example, guided ray 234 approaches surfaces 236 and 238 at greater than the critical angle, reflecting down toward surface 236. The ray transmits through that surface, air space 202, and surface 240. Now inside adjacent prism 200, ray 234 reflects at surface 242 and continues on to the next set of facets. Surfaces 218, 224, 240 and 242 simultaneously perform as collection surfaces for incident rays and guiding surfaces for captured rays. The other guided rays that are shown also cross air space 202 and result in path angles that stay within guided range 228.

Figure 5:
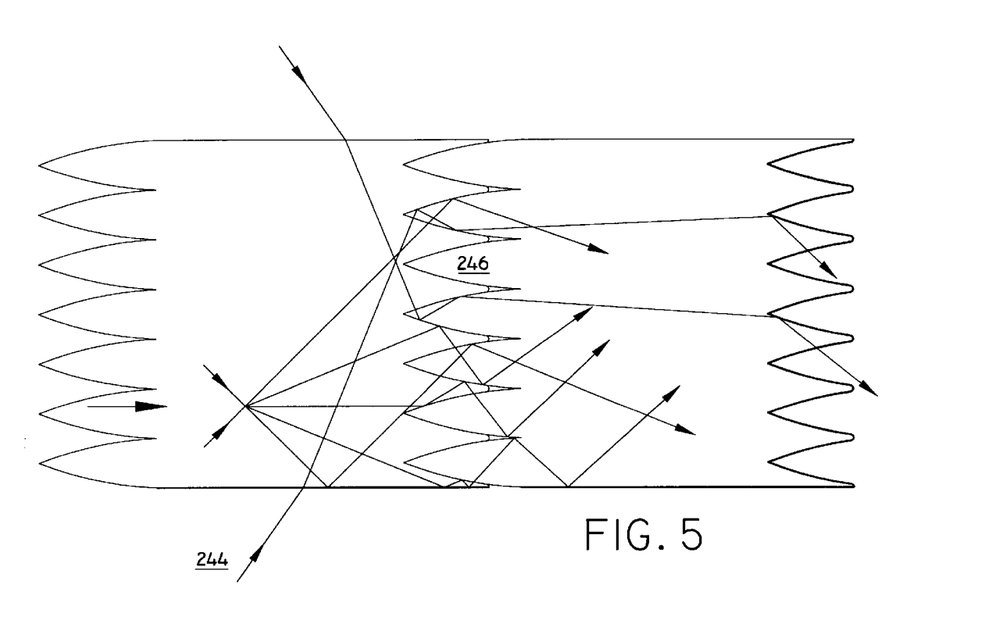
FIG. 5 is a cross-sectional view of identical interlocking prisms of the fourth preferred embodiment without reflective coating.

FIG. 5 is identical to FIG. 4 except that the reflective coating 206 has been removed. Ray 244 is now able to enter the prism through the bottom surface to be collected into the range of guided rays. Ogive profile 246 is unique in its ability to collect ascending rays as well as descending rays.

The reader has now been introduced to the four basic prism profiles that constitute the working media in all side-collecting lightguides.

MANUFACTURING

No new technology is needed to manufacture the multifaceted prisms shown in the previous figures. Every optical glass and plastic that is currently available can be formed, by suitable means, into the basic prism profiles. Glass has the ability to handle the higher temperatures associated with the innermost prism. Injection molded plastic could easily be sufficient in most applications. The prisms can also be compression molded, extruded or micromachined. Facet tip and valley radii should be kept as small as practicable to reduce losses. Smooth facet surfaces are desirable. However, facet surface waviness and concentricity are not critical since small deviations would help provide the sufficiently wide air space between abutting prisms that is necessary to produce total internal reflection. Small bosses may be molded onto the prisms to ensure sufficient spacing. In order to greatly reduce Fresnel reflection losses, preparation should include the deposition of an anti-reflection film to all facet surfaces.

Figure 6:
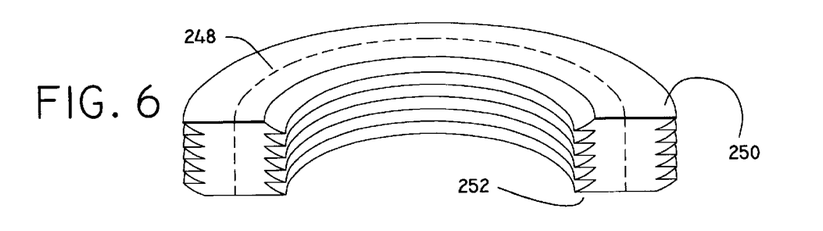
FIG. 6 is a perspective view of an annular prism manufacturing technique.

In FIG. 6 there is shown an annular prism of the kind used in spot focus side-collecting lightguides. Each of the four basic prism profiles can be formed as a ring. For ease of manufacture and assembly the prism should be produced in a half section as shown. The element could be further simplified by subdividing it at margin 248. In this way, collecting-facets 250 and guiding-facets 252 can be molded separately and then joined together with an index-matching adhesive at margin 248.

Figure 7A:
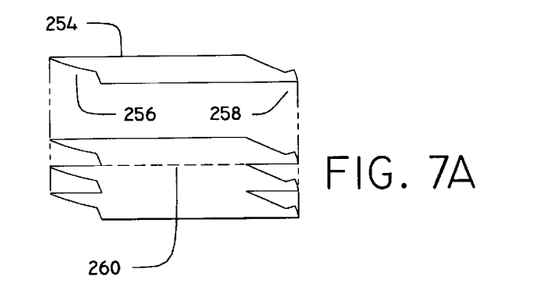
FIG. 7A is a cross-sectional view of a prism construction technique using adhesive.

The prism profiles of FIG. 1 and FIG. 2 can be produced in a single piece construction due to the relatively simple facets. In FIG. 7A there is shown an alternative construction for the more challenging FIGS. 3 and 4. The prism is assembled using a member 254 that has an integral collecting-facet 256 on one end and an integral guiding-facet 258 on the other end. Top and bottom surfaces are plane-parallel. The identical members are stacked and joined together with an adhesive at margins 260.

Figure 7B:
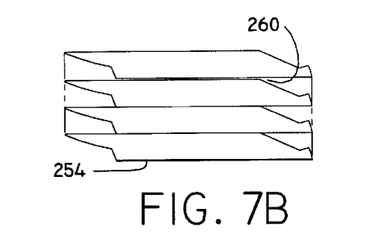
FIG. 7B is a cross-sectional view of a prism construction technique without adhesive.

In FIG. 7B identical members 254 are simply stacked together without adhesive. The additional air gaps, at margins 260, will allow the collection and guidance of light.

Figure 8A:
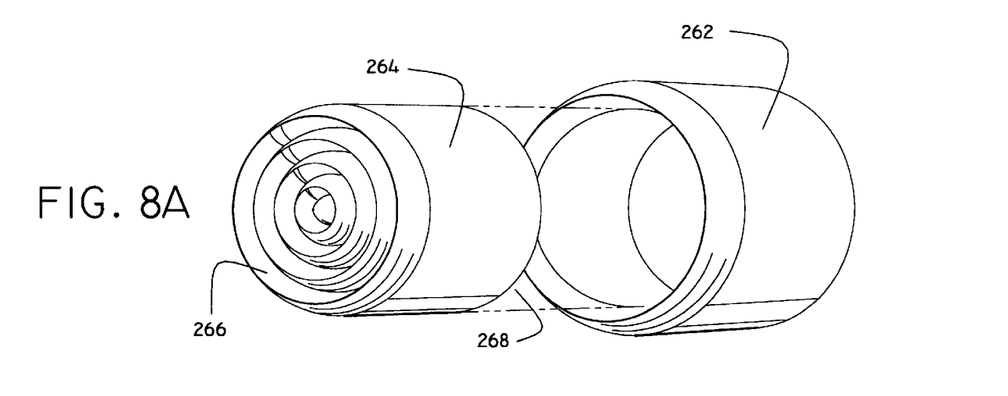
FIG. 8A is a perspective view of a coaxial prism construction technique.

FIG. 8A shows the construction of a prism element used in a side-collecting lightpipe. The prism is composed of many coaxial cylinders 262 and 264. Each cylinder has a collecting-facet 266 and a guiding-facet 268 of the profile type found in FIG. 5. Each cylindrical member has a diameter allowing all the members to be nested and joined together with an adhesive.

COLLECTOR SHAPES

Figure 8B:
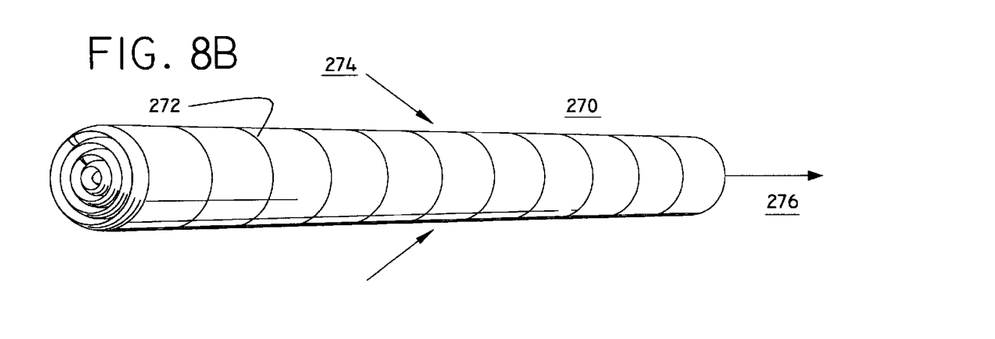
FIG. 8B is a perspective view of a collector using the prism of FIG. 8A.

In FIG. 8B there is shown a side-collecting lightpipe 270 that is composed of a series of prisms described in FIG. 8A.

The prisms are placed side-by-side so that collecting-facets are interlocked 272 with guiding facets. Incident light 274 is collected from all around the pipe and delivered in flow direction 276.

Figure 9:
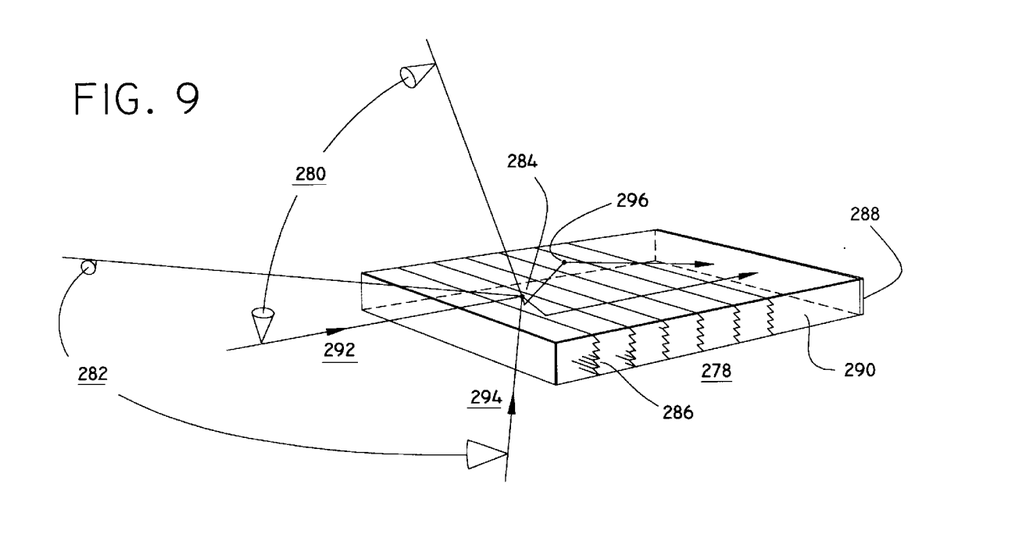
FIG. 9 is a perspective view of a collector showing general acceptance angles.

In FIG. 9 the wide-angle capabilities of collecting lightguide 278 are shown. The collector is able to accept incident light that arrives within a 70 degree altitude range 280 and a 90 degree azimuth range 282. For clarity all of the rays within the acceptance ranges are shown coupling into the side-collecting lightguide at point 284. Linear prism profile 286 can be any of those described in FIGS. 1, 3 or 4. The low-profile collector has a photovoltaic receiver 288 mounted on innermost prism 290. Extreme meridional ray 292 of altitude range 280 enters the collector and is captured. The ray propagates through the succeeding adjacent prisms directly to receiver 288. Extreme off-axis ray 294 of azimuth range 282 enters the collector and is captured. The ray propagates across the adjacent prisms, approaching a wall at greater than the critical angle. Ray 294 internally reflects at point 296 and continues on to receiver 288. This concentrating collector requires only one azimuth adjustment to collect sunlight all day and throughout the year.

Figures 10, 11:
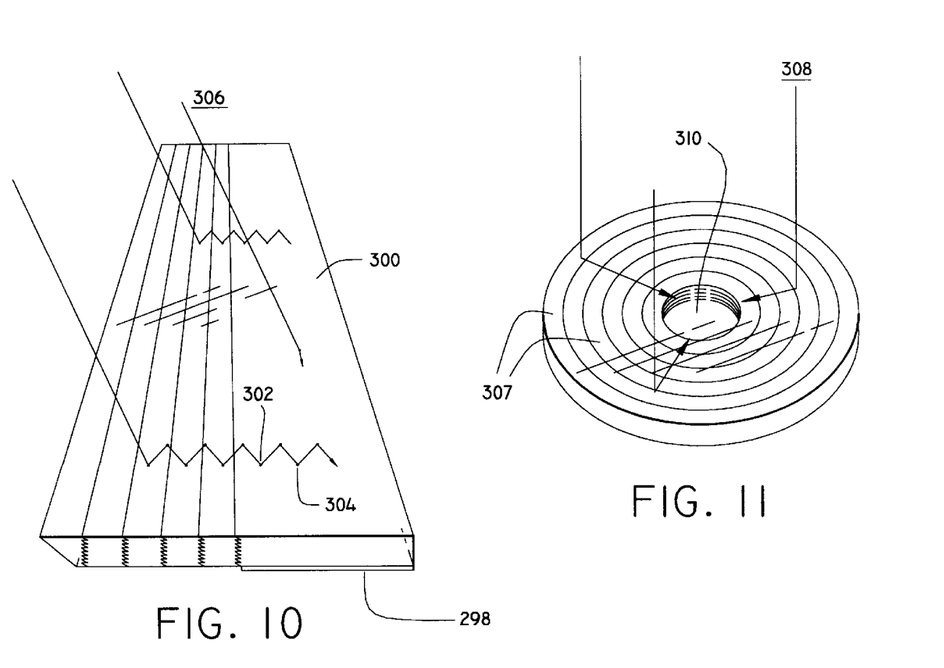
FIG. 10 is a perspective view of a flat, line-focusing collector.
FIG. 11 is a perspective view of a flat, spot-focusing collector.

The rectangular aperture collector of FIG. 10 has a linear photovoltaic receiver 298 mounted on the smooth bottom surface of innermost prism 300. The bottom surface-mounted receiver provides many opportunities 302 and 304 for captured light to be absorbed. Incident ray 306 has a direct path to the photovoltaic receiver 298.

FIG. 11 is a spot-focus collector assembled of annular prisms 307 having the profile of FIG. 2. The prisms direct incident light 308 to photovoltaic receiver 310 which is bottom surface-mounted to the innermost prism. Annular prisms offer the kind of in-plane directional control that greatly increases the concentration ratio.

Figure 12:
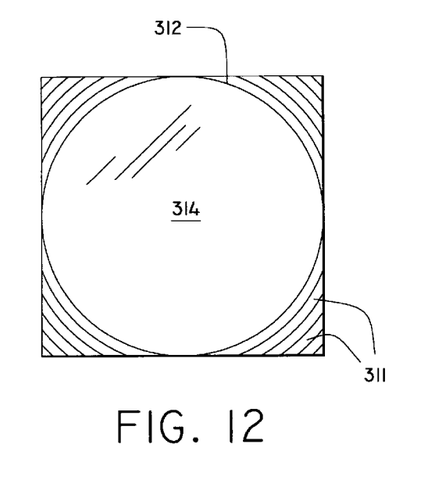
FIG. 12 is a plan view of a square spot-focusing collector.

FIG. 12 is a spot-focus collector having a square aperture. Prisms 311 are annular elements that have been cut into sections to construct the four corners. Large innermost prism 312 has a photovoltaic receiver 314 that has been optically-coupled to the smooth bottom surface. In this way, inexpensive round solar cells can be made "square" for improved array packing density.

Figure 13:
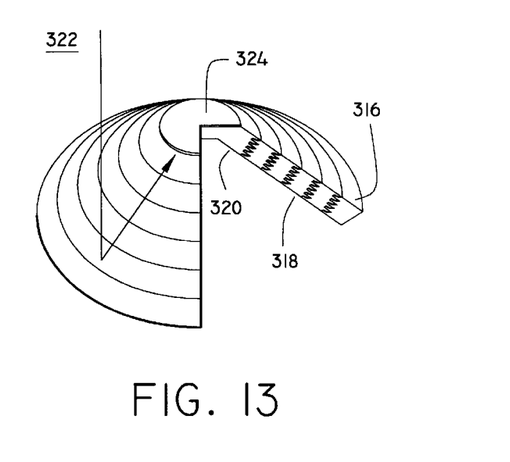
FIG. 13 is a perspective view of a conical spot-focusing collector.

FIG. 13 is a spot-focus convex conical collector. The prisms are nested annular elements having the profile of FIG. 3. Outermost prism 316, intermediate elements 318 and innermost prism 320 have cross-sectional profiles that are generated out-of-plane in order to construct the cone. Ray 322 is collected and guided to photovoltaic receiver 324, mounted on the apex surface of innermost prism 320. It is important to note that any of the four basic prism profiles may be employed in a non-planar format.

Figure 14:
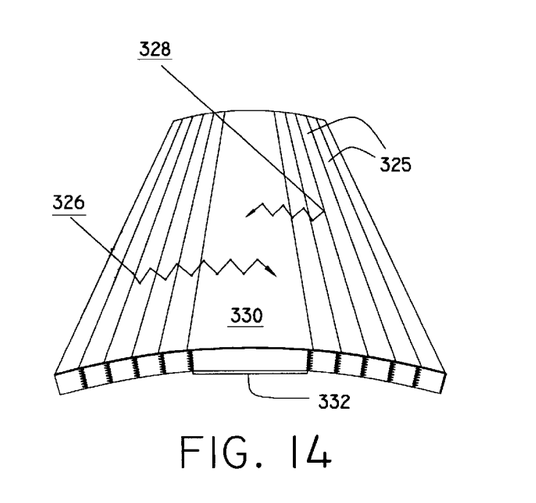
FIG. 14 is a perspective view of a arched line-focusing collector.

FIG. 14 is a linear-focus arched collector having a rectangular aperture. Prisms 325 have the profile of FIG. 3. Ray 326 is collected with-the-flow and ray 328 is collected opposite-the-flow. Innermost prism 330 has a bottom surface-mounted photovoltaic receiver 332 providing many opportunities for captured light to be absorbed. Each prism's top, bottom and facet draft surfaces are curved, having been generated about a common radius.

Figure 15:
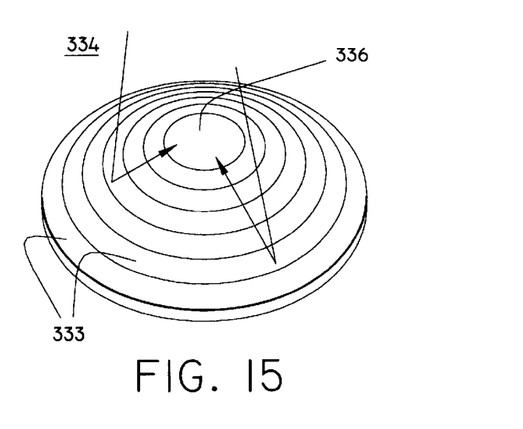
FIG. 15 is a perspective view of a domed spot-focusing collector.

FIG. 15 is a spot-focus domed collector. Annular prisms 333, having the profile of FIG. 3, collect light 334 and deliver it to innermost apex element 336. Prism top, bottom and facet draft surfaces are all different spherical curves generated about a common radius. The interlocking nested elements create a mechanically stable assembly.

Figure 16:
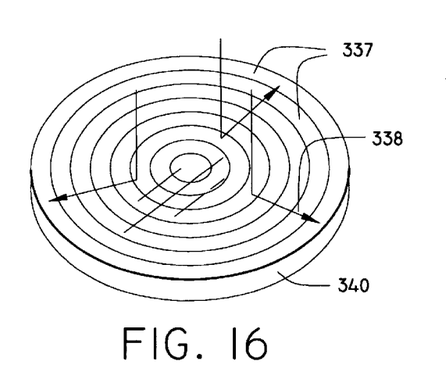
FIG. 16 is a perspective view of a round collector having a circular focal zone on the outermost edge.

FIG. 16 is a flat assembly of nested annular prisms 337. All four of the basic prism profiles can be reversed so that flow 338 is toward outermost prism 340.

Figure 17:
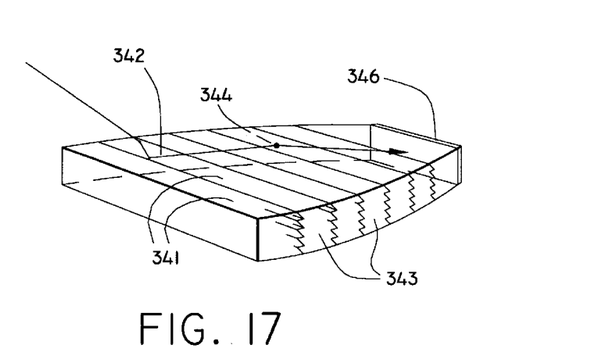
FIG. 17 is a perspective view of flat, spot-focusing collector having parabolic sides.

FIG. 17 is a planar collecting lightguide in the shape of a compound parabolic concentrator. Linear prisms 341, having the profile of FIG. 1, are placed side-by-side. Element ends 343 gradually taper inward forming a parabolic profile on opposite sides of the collector. Captured ray 342 approaches a parabolic wall at greater than the critical angle and is internally reflected 344 toward photovoltaic receiver 346. The concentrator has an acceptance angle of approximately 60 degrees.

Figure 18:
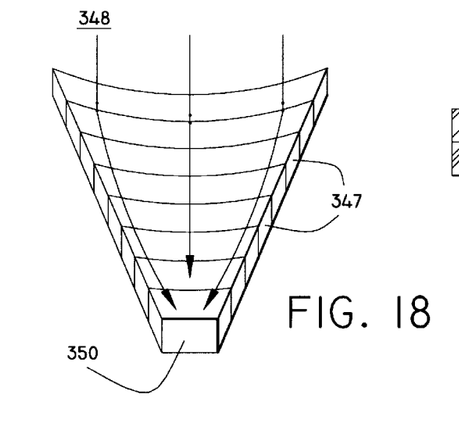
FIG. 18 is a perspective view of a trough-shaped spot-focusing collector.

FIG. 18 is a trough collector having a triangular aperture. All of the prism elements 347 have the same radius of curvature. Ray 348 is captured and takes an inwardly curving path toward focus 350. All four of the basic prism profiles may be adapted to this concept.

Figure 19:
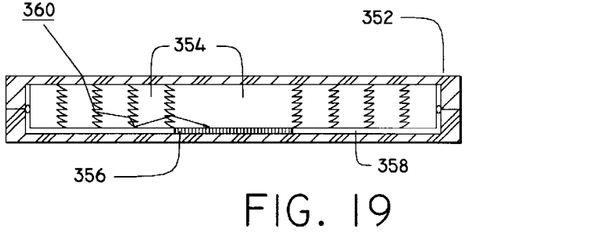
FIG. 19 is a representational view of an enclosure for side-collecting lightguides.

FIG. 19 is a general view of a glass enclosure 352 that is to be used to isolate the series of prisms 354 and photovoltaic receiver 356 from the environment. The prisms must be kept clean in order to perform properly. To this end, an atmosphere of high-purity inert gas should be maintained inside 358 the enclosure. The gas must be dry to ensure that there will not be any moisture in the air spaces between prisms. Dry surfaces will collect incident light 360, by total internal reflection, more effectively. The enclosure will keep the elements closely-packed to allow the interlocking facets to self-align the entire optical train.

Figure 20:
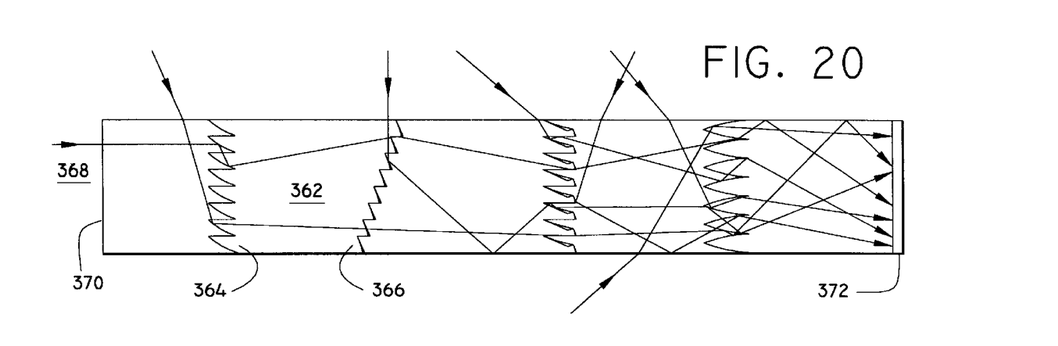
FIG. 20 is a cross-sectional view of a flat collector employing all four prism profile preferred embodiments.

FIG. 20 is a side-collecting lightguide employing all four basic prism profiles simultaneously. The profiles of FIGS. 1, 2, 3 and 4, can be used in different combinations to satisfy nearly every non-imaging collector requirement. A combination prism, such as 362, would then need to have a facet profile of one type 364 on the upstream side and a facet profile of another type 366 on the downstream side. The facets would still be shifted in translation to allow a series of coplanar top and bottom surfaces. It should also be noted that the collector can be end-fired. For example, ray 368 enters the collector through the upstream end 370 and propagates through the different faceted surfaces, arriving at photovoltaic receiver 372 along with all of the other collected rays.

In summary, the reader has been shown the four basic light collecting and guiding prism elements. The details of how light is reflected and transmitted by each prism have been shown and described. Prism manufacturing alternatives have been discussed. Finally, prototype side-collecting lightguide shapes were revealed so that the reader will recognize the synergistic nature of this invention.

Although preferred embodiments have been treated in detail, it should be understood that reasonable variations and modifications are possible without departing from the spirit and scope of the invention.

What is claimed is:

1. A light collecting and guiding system comprising at least four prisms placed side-by-side, said prisms having a smooth series of top surfaces and an opposing smooth series of bottom surfaces along the full length of said guiding system, said prisms also having adjacent sides oriented generally perpendicular to said top surfaces and said bottom surfaces, said adjacent sides being formed with a plurality of interlocking facets, whereby said top surfaces accept incident light and said interlocking facets collect the light by total internal reflection while simultaneously guiding light by total internal reflection and transmission to a focal zone disposed at the downstream end of said system.

2. The light collecting and guiding system of claim 1, wherein said system is flat, being an assembly of linear said prisms, said interlocking facets being oriented alike with respect to said focal zone.

3. A system of adjacent prisms using interlocking sides to collect and guide light from upstream to downstream comprising:

a) An upstream prism having a quadrilateral profile in transverse cross section, said profile including a smooth top surface and opposing smooth bottom surface, said profile also including first and opposing second sides oriented substantially perpendicular to the top and bottom surfaces, the first side having a plurality of collecting facets formed thereon and the second side having a plurality of guiding facets formed thereon, b) A downstream prism having a quadrilateral profile in transverse cross section, said profile including a smooth top surface and opposing smooth bottom surface, said profile also including first and opposing second sides oriented substantially perpendicular to the top and bottom surfaces, the first side having a plurality of collecting facets formed thereon and the second side having a plurality of guiding facets formed thereon, whereby the guiding facets of said upstream prism form interlocking sides with the collecting facets of said downstream prism, wherein the top surface of said upstream prism accepts incident light, said light transmits through the interlocking sides into said downstream prism, the light then being totally internally reflected into the longitudinal plane of said system by the collecting facets of said downstream prism and, having been collected, the light is then guided downstream by total internal reflection at the top surface, the bottom surface and the guiding facets of said downstream prism.

* * * * *